United States Patent [19]
Melgaard

[11] Patent Number: 5,263,265
[45] Date of Patent: Nov. 23, 1993

[54] CONVECTION/RADIATION MATERIAL TREATMENT OVEN
[75] Inventor: Hans L. Melgaard, North Oaks, Minn.
[73] Assignee: Despatch Industries, Minneapolis, Minn.
[21] Appl. No.: 671,175
[22] Filed: Mar. 15, 1991

Related U.S. Application Data
[63] Continuation of Ser. No. 425,570, Oct. 23, 1989, abandoned.
[51] Int. Cl.$^5$ ............................................... F26B 7/00
[52] U.S. Cl. ........................................ 34/17; 34/18; 34/41
[58] Field of Search .............. 432/175, 209, 72, 8, 432/59; 34/41, 23, 18, 155, 156, 39, 17

[56] References Cited
U.S. PATENT DOCUMENTS

| 3,183,604 | 5/1965 | Stauffer | 34/18 |
| 3,396,415 | 8/1968 | Meier-Windhont | 34/18 |
| 3,581,679 | 6/1971 | Jansen et al. | |
| 4,115,052 | 9/1978 | Flynn . | |
| 4,132,007 | 1/1979 | Voorheis | 34/35 |
| 4,231,165 | 11/1980 | Gresens et al. | 432/72 |
| 4,326,342 | 4/1982 | Schregenberger | 432/59 |
| 4,443,185 | 4/1984 | Smith | 432/72 |
| 4,529,379 | 7/1985 | Di Castri | 432/59 |
| 4,591,336 | 5/1986 | Konczalski | 432/59 |
| 4,697,355 | 10/1987 | Mino et al. | 34/41 |
| 4,792,302 | 12/1988 | Baker et al. | 432/59 |
| 4,850,860 | 7/1989 | Albonetti | 432/209 |
| 4,918,828 | 4/1990 | Ruottu et al. | 34/23 |
| 4,952,145 | 8/1990 | Kwiatkowski et al. | 432/175 |

Primary Examiner—Henry A. Bennet
Attorney, Agent, or Firm—Fredrikson & Byron

[57] ABSTRACT

A material treatment oven having a housing defining an elongated generally vertical oven cavity having open ends for material to enter and exit. The oven is further characterized by having both convective and radiant heat transfer within the oven cavity.

14 Claims, 6 Drawing Sheets

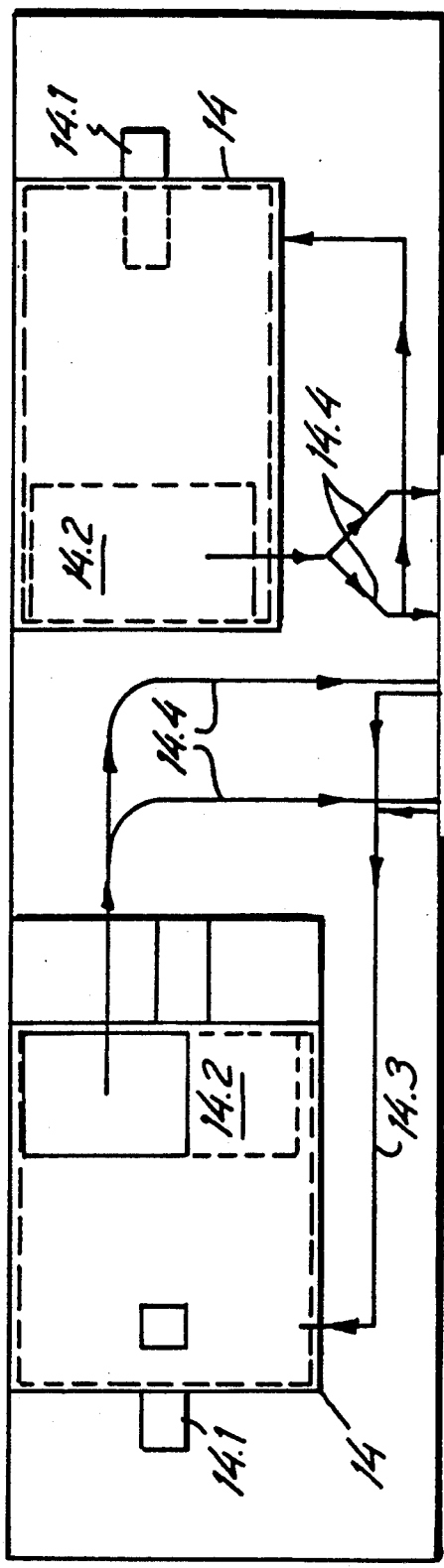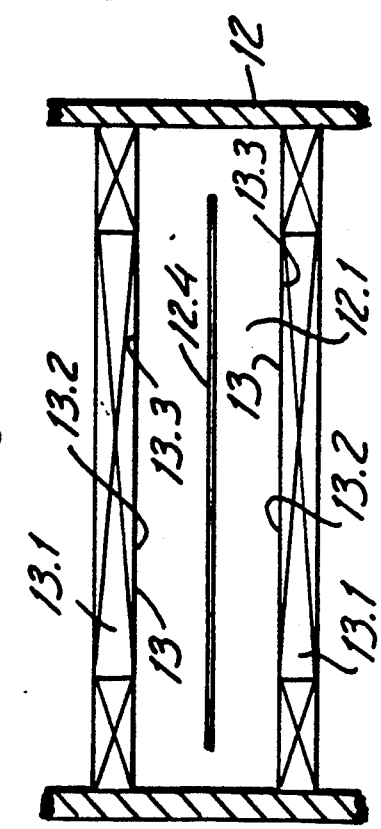

CONVECTION/RADIATION MATERIAL TREATMENT OVEN

This application is a continuation, of application Ser. No. 425,570, filed Oct. 23, 1989 now abandon.

FIELD OF THE INVENTION

The present invention relates to material treatment ovens for heating webs of material and other workpieces that move through the oven.

BACKGROUND OF THE INVENTION

Material treatment ovens are employed to heat elongated moving workpieces such as carbonaceous fibers, adhesive coated webs and coated wires from which solvent or other by-products of the heating process are to be removed. These ovens commonly make use of an elongated heating cavity or chamber, and may contain payout and take up rollers at opposite ends of the cavity to feed material into the cavity and to collect the material as it exits from the cavity. In the usual course, air or other gas is heated by electric or gas heaters and is directed into the oven cavity where it contacts and heats the moving workpiece. The hot air collects solvents or other products of the heating process from the workpiece, and eventually is exhausted. The exhausted hot air, laden with the by-products of the heating process, may then be subjected to solvent recovery or other pollution controlling processes to prevent the solvent or other by-products from escaping into the atmosphere. It is generally impractical to reuse the hot air that is exhausted from the oven cavity. As a result, great quantities of fresh air must be heated and although a portion of the heat may be recovered, the energy loss can be large. Moreover, since necessarily a large volume of heated air passes through the oven cavity to both heat the material and to receive solvent or other chemicals from the material being heated, high volume solvent recovery or other air cleansing units may also be required.

Another type of oven utilizes a cavity in which heat radiators are positioned to radiate heat energy toward a workpiece. Since the temperature of the workpiece depends upon the amount of radiant heat that it absorbs, it is often difficult to control with accuracy the temperature to which the workpiece is heated. It is also difficult to control with accuracy the temperature of the radiant elements. Care must be taken to avoid dangerous concentrations of solvent or other volatile materials in the oven cavity. Oven cavities employing radiant elements commonly either are largely open or are quite short to avoid build up of dangerous concentrations of solvents or other impurities, or, if longer, are employed with workpieces which yield little, if any, volatile or air-entrained products of the heating treatment.

SUMMARY OF THE INVENTION

The present invention provides an energy-efficient continuous material treatment oven that utilizes radiant heat as a primary heat source and that employs relatively small volumes of heated air or other gas to contact and receive from a workpiece the products of the heat treatment. The material treatment oven includes a housing defining an elongated cavity through which a moving workpiece such as a web of material can be transported. A radiant heating panel is provided having a radiant surface facing the interior of the oven cavity for radiating heat energy to workpiece material passing through the cavity. The oven includes a source of hot gas such as air, and first plenum means for communicating a first stream of the hot gas from the source to the reverse side of the radiant heating panel to heat the same and to return said gas stream to the source. Second plenum means is provided through which a second stream of hot gas at a different temperature is conveyed to the oven cavity to treat the workpiece material, and exhaust means are provided to exhaust the second gas stream from the cavity after making a single material-contacting pass in the cavity. In this manner, the radiant panel may be heated to a predetermined temperature by the first hot gas stream to cause the panel to radiate heat to the workpiece at a predictable rate. The second stream of hot gas flows into the cavity into contact with the workpiece, and also may transmit heat to the workpiece or, for that matter, may receive heat from the workpiece. Since the majority of heat energy transferred to the workpiece preferably is provided by radiation of heat energy from the radiant panel, the second stream of hot gas, which may be at a lower temperature, may be supplied at a low volumetric flow rate compared to that of the first stream. The flow rate of the second steam may be adjusted so as to be only sufficient to remove solvent or other impurities from the workpiece and cavity as the workpiece is heated. It will be understood that this second stream of heated gas may also serve to mediate sharp temperature chances in the workpiece due to fluctuations in the radiant heat that is absorbed, the latter being caused, for example, by variances in the spacing between the workpiece and the radiant panel.

In a preferred embodiment, the oven of the invention includes a housing defining an elongated oven cavity having open ends through which material to be treated may enter and exit and a radiant panel having a radiant surface facing the interior of the oven cavity. The oven includes at least one source of hot gas, and first plenum means to deliver a stream of the hot gas from a source to the other side of the radiant panel means to heat the panel and to recirculate the hot gas to the hot gas source. Second plenum means are provided to convey hot gas from the hot gas source to the oven cavity, and damper means may be provided to blend a controlled amount of fresh gas into the last-mentioned stream of hot gas to form a second hot gas stream for directly contacting workpiece material in the oven cavity. Exhaust means are provided to exhaust the second gas from the oven cavity. Since a portion of hot gas from the hot gas source is thus employed within the elongated oven cavity to contact the workpiece material passing therethrough, and since this gas is thereafter not recirculated but rather is exhausted from the system, the source of hot gas includes fresh gas supply means supplying to it make up gas. Also, since gas that is supplied to the oven cavity is not recirculated to the hot gas source, the qaseous stream employed to heat the radiant panel remains clean and non fouling.

In a second preferred embodiment of the invention, the source of hot gas, first plenum means and the radiant panel define an essentially closed loop which may include a blower and regulated heater to provide a continuous flow of hot air to the radiant panel. A second source of hot gas may be provided to the second plenum means to contact the workpiece material being conveyed therethrough, this second gas stream then being exhausted from the system. The second hot gas source includes a source of fresh gas, and heating means for heating the fresh gas. The exhausted second gas stream may be cleansed by passing it through a high temperature incinerator, and heat exchange means may be employed to transfer heat from the incinerated gas to the fresh gas intake.

The hot gas employed in ovens of the invention desirably is air, although other gases such as nitrogen and argon may be employed as well.

DESCRIPTION OF THE DRAWING

FIG. 1 is a schematic top view of an oven of the invention;

FIG. 6 is a broken-away, cross-sectional view taken along line 6—6 of FIG. 5.

DESCRIPTION OF THE PREFERRED EMBODIMENT

Figure 2:
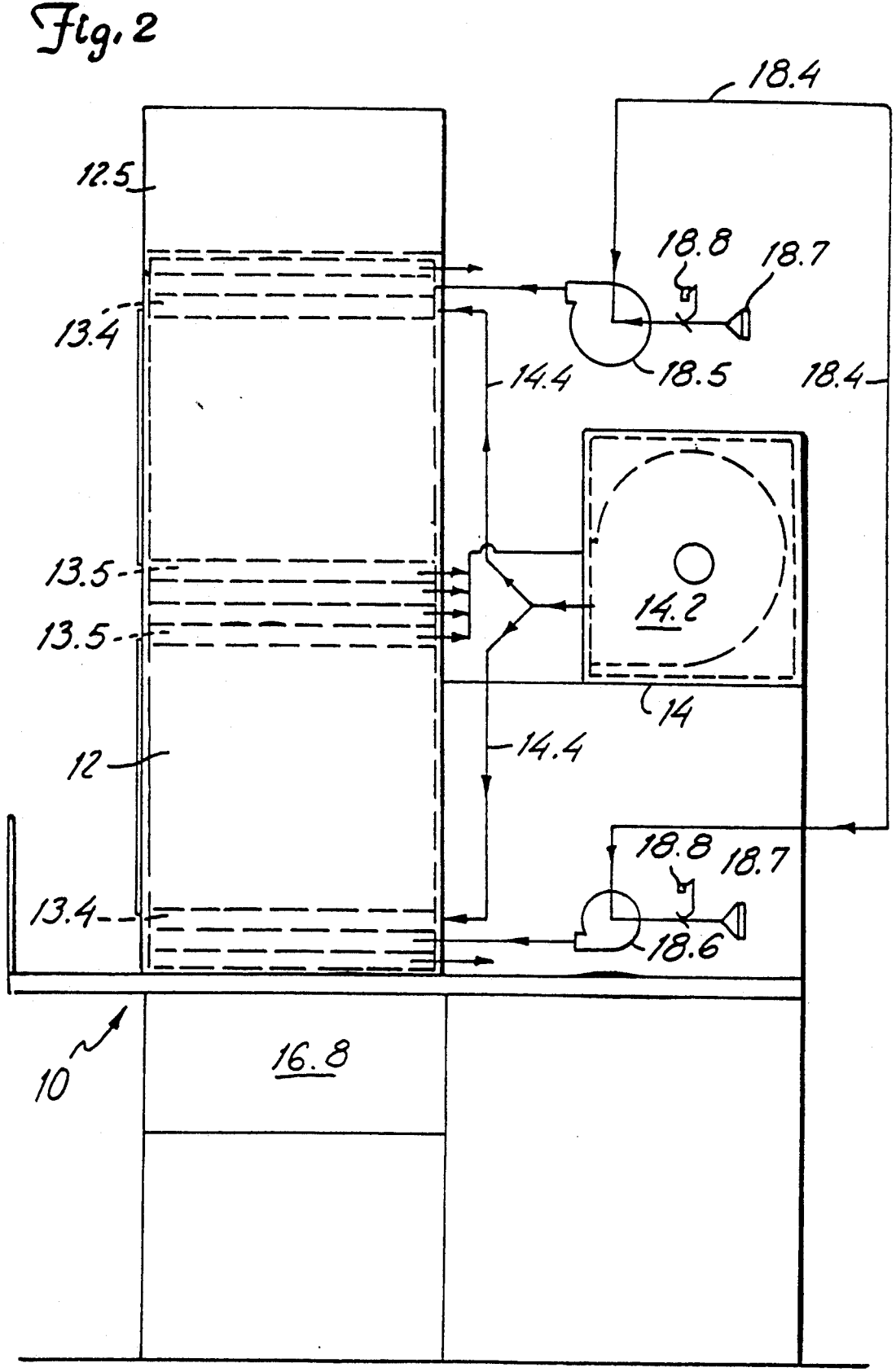
FIG. 2 is a right side view of the oven of FIG. 1.
Figure 3:
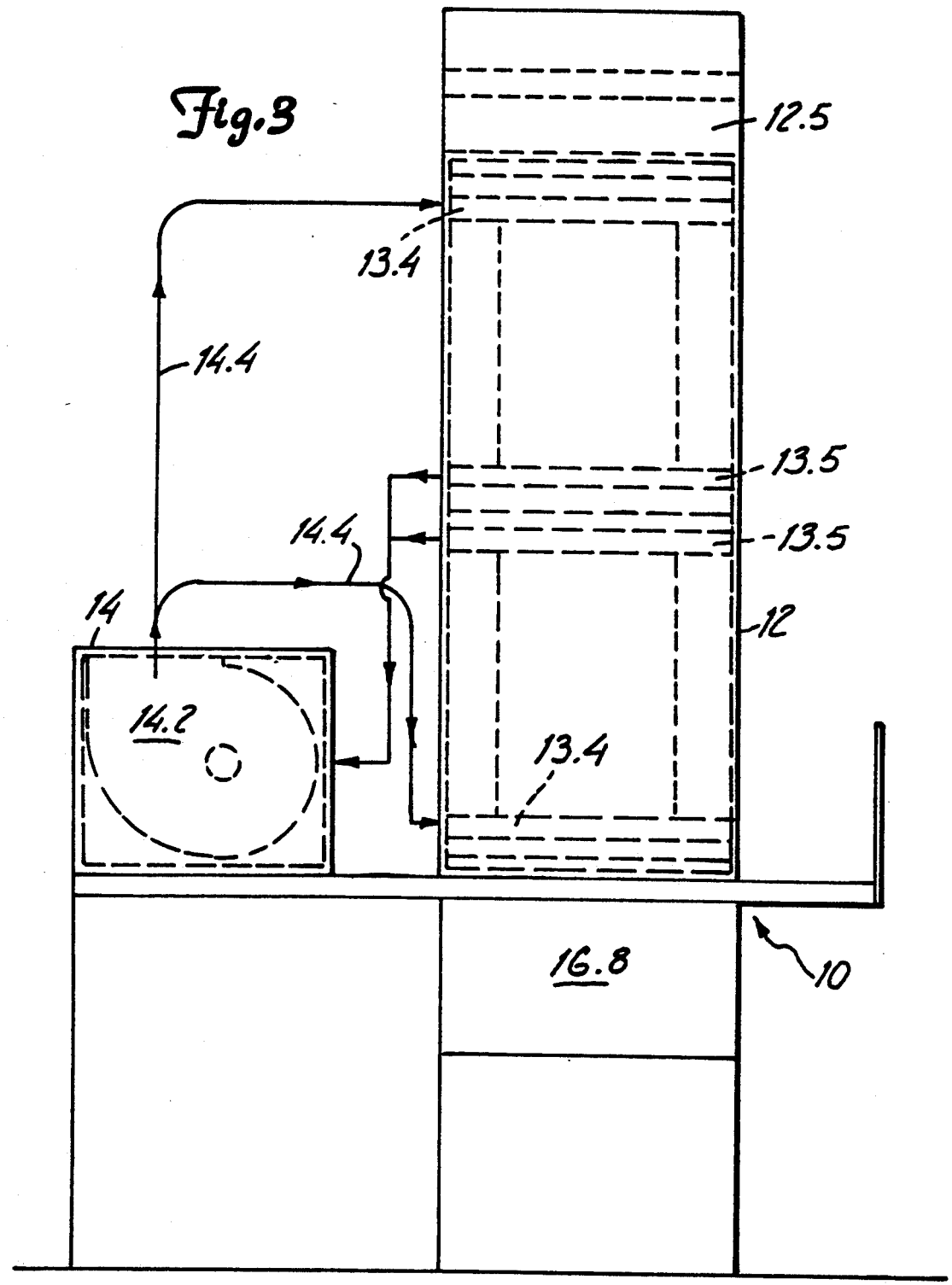
FIG. 3 is a left side view of the oven of FIG. 1.

In the description that follows, the heated gas that may be employed in ovens of the invention is referred to for convenience as air, although any gas such as nitrogen or argon might be used as well.

As will be described in greater detail below in connection with the drawing, ovens of the invention employ two streams of hot air, one stream being passed to a radiant panel to conduct heat to the panel and cause the latter to radiate heat toward a workpiece passing through an oven cavity, and the other stream, generally at a lower temperature, being conveyed within the oven cavity into contact with the workpiece material to be heated. The second stream of hot air may itself convey heat energy to the workpiece, and receives from the workpiece the by-products of the heating step. These products may, for example, be solvent vapors when the heating step serves to dry a solvent-containing adhesive or other material upon a workpiece. The second stream makes but a single pass into and out of the oven cavity and then is exhausted, the second stream thus not being recirculated to the source of hot air. In this manner, the source of hot air supplies only relatively clean, solvent-free air to the radiant panel, and fouling of the heat-absorbing surface of the panel is thus avoided.

The first and second streams of hot air may both be drawn from the hot air source, or may be drawn from separate sources. In a first embodiment, the first and second hot air streams are drawn from the same source, with the first hot air stream passing from the hot air source into contact with the radiant panel to heat the same and then returning to the hot air source. The second stream of hot air which passes into the oven cavity into contact with the material being treated is drawn, in this embodiment, from the heating source as well, but has mixed in with it fresh air to reduce the temperature of the second hot air stream. This embodiment will be described in greater detail with reference to FIG. 7 below.

In a second preferred embodiment, described below in connection with FIGS. 1-6, hot air from the hot air source may be employed to transmit heat to the radiant panel, and a second source of hot air may be employed to furnish the second stream which enters the oven cavity itself. In this embodiment, the oven may include a source of fresh air, and heat exchanger means for transferring heat from the stream of air that is exhausted from the oven cavity to fresh air from the fresh air source, the heated fresh air being employed as the second hot air stream to the oven cavity. Exhausted air from the oven cavity may be incinerated to remove pollutants, and heat from the resulting very hot air stream may be transferred to the fresh air stream.

In the first of the embodiments referred to next above, the hot air source comprises a heater which may be electric or gas fired, a blower for conveying a stream of air through the heater, and a first plenum for conveying the heated air out of the hot air source and into contact with the radiant heating panel. The hot air stream employed to heat the panel is recirculated by the first plenum to the heater. Another stream of hot air is supplied by the hot air source, and to this stream a controlled damper supplies a regulated quantity of fresh air which may be at ambient temperature the fresh air mixing with the hot air and the resultant stream being conveyed into the oven cavity. Desirably, the radiant panel means comprises at least a pair of radiant panels which themselves form opposed, confronting walls of the oven cavity. Each of the radiant panels forms a wall of a a radiant panel duct, the panel separating the interior of that duct from the oven cavity and the duct forming a length of the first plenum. In this manner, the heater and blower, together with the first plenum incorporating the radiant panel duct, form a recirculating hot air loop through which clean hot air is continuously recirculated during operation of the oven. To the extent that a small amount of hot air is withdrawn from the loop for mixing with fresh air and ultimate delivery to the interior of the oven cavity, means are provided to supply an equal amount of fresh air to the hot air loop to maintain its volume. It will be noted that once the second hot air stream enters the oven cavity, it is not returned to the hot air loop.

Figure 4:
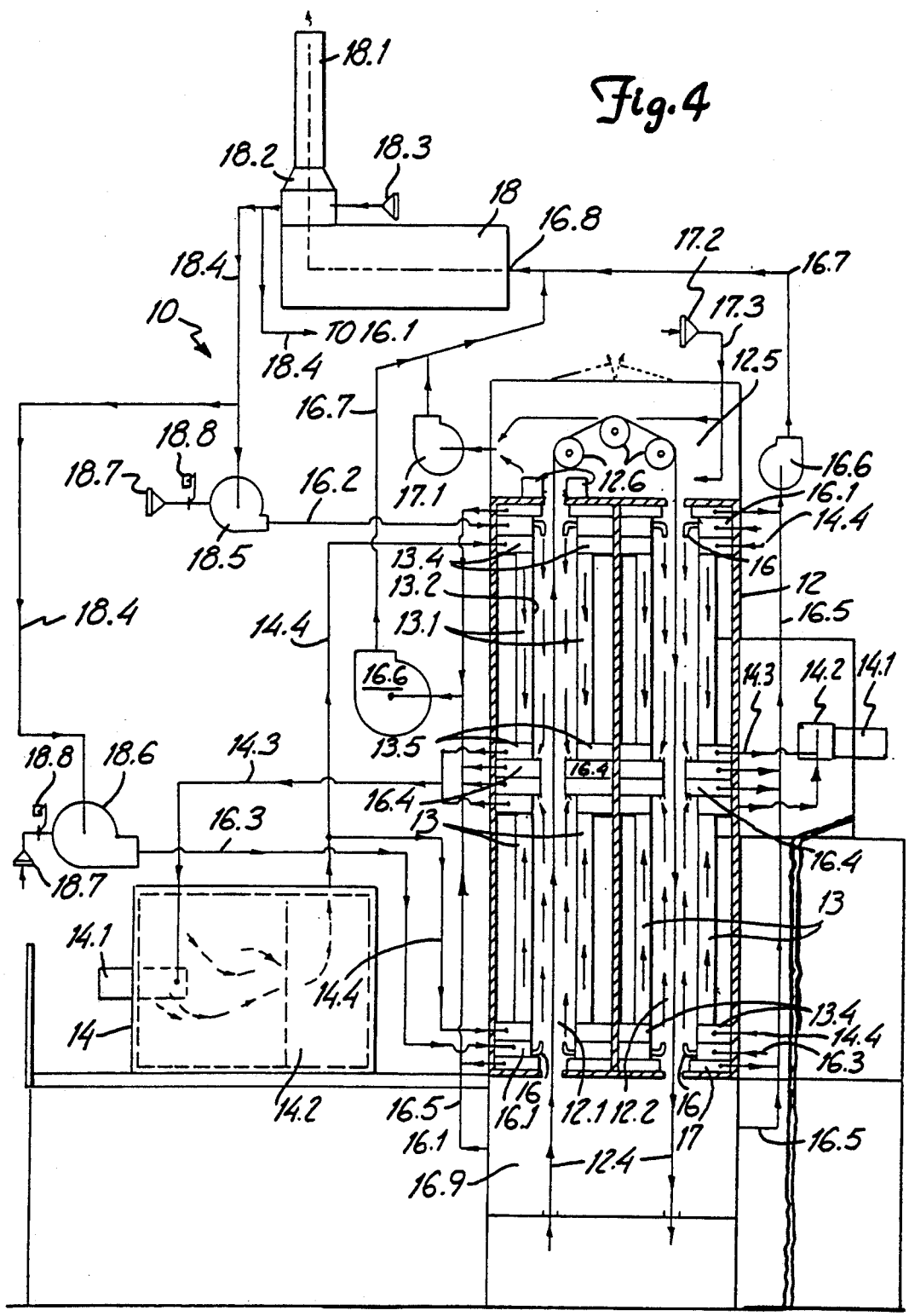
FIG. 4 is a front view of the oven of FIG. 1.

Referring now to the drawing, a preferred embodiment of the invention is shown in FIGS. 1-6, inclusive. With reference to FIG. 4, the oven of the invention is designated generally as 10 and includes a housing 12 which in the embodiment of FIG. 4 is generally vertically elongated. The oven in FIG. 4 includes two vertically extending, elongated oven cavities 12.1, 12.2. The walls of the housing which house the oven cavities desirably are insulated and are shown in cross section as 12.3. Continuous arrow 12.4 designates the path taken by a web of workpiece material as it travels upwardly through oven cavity 12.1 into turnaround chamber 12.5 and about rollers 12.6 and thence downwardly through oven cavity 12.2.

As the work piece travels along the path 12.4, it is subjected to heat treatment in oven cavity 12.1 before contacting these rollers 12.6, as is evident from FIG. 4. One of ordinary skill in the art will recognize that this construction is advantageous for coated materials, such as a work piece coated with an adhesive, in that the coating is heat treated before it contacts any rollers. This may permit the coating to be sufficiently heat treated to make it resistant to being marred by contact with the rollers before the work piece exits oven cavity 12.1. Furthermore, such a vertical construction tends to be more compact in that the floor space in a factory occupied by the oven is minimized.

Figure 5:
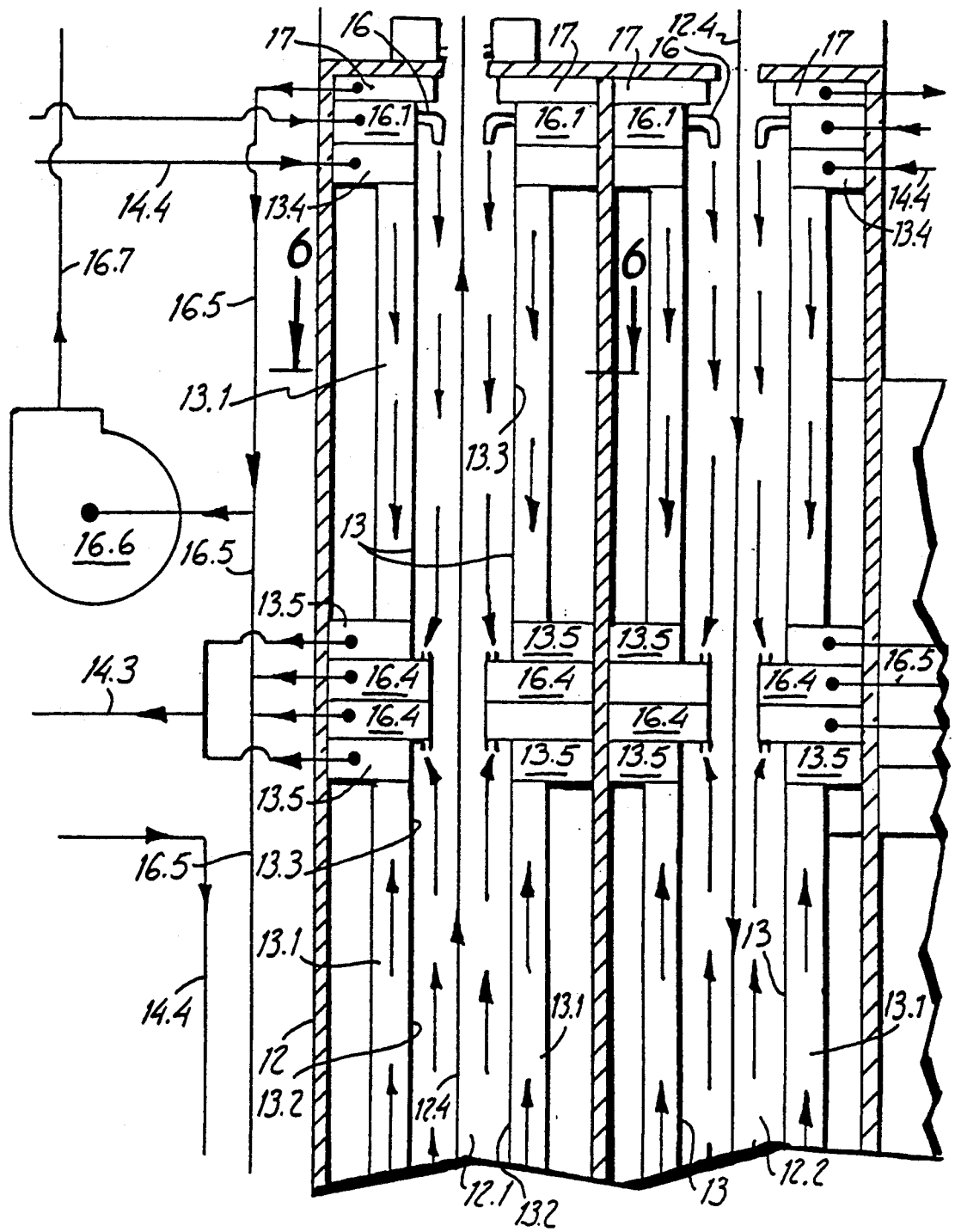
FIG. 5 is an enlarged, broken-away view showing a portion of the oven of FIG. 4.

A plurality of radiant panels are shown generally as 13 in FIGS. 4 and 5, and although the panels may take various shapes, they are depicted in the drawing-edge on as generally flat, parallel, spaced metal webs which define between them the oven cavity. The radiant panels are shown in plan in FIG. 6, and each radiant panel is shown as a wall of a hot air duct 13.1 through which a first stream of hot air passes to heat the panel, as subsequently described in greater detail. One surface 13.2 of the radiant panel faces the interior of the oven cavity, and is referred to herein as the radiant surface. The reverse panel surface 13.3 receives heat primarily by conduction from the first hot gas stream that passes through the ducts 13.1. The latter ducts are served at their ends by supply plenums 13.4 that are positioned, respectively, adjacent the bottom and top of the vertical cavities, and gas takeup plenums 13.5 are positioned near the center of the vertical cavities to receive hot air from the ducts 13.1. It will be understood that in this embodiment, the supply system that supplies hot air to the ducts 13.1 to heat the radiant panels represents essentially a closed loop, which will now be described particularly with reference to FIGS. 4 and 5.

Shown at 14 in FIG. 4 is a housing which includes a gas burner 14.1 and a blower shown schematically as 14.2. Beginning with air in return duct 14.3, the air passes through the burner 14.1 and is propelled by the blower 14.2 through supply ducts 14.4 to the supply plenums 13.4. It will be noted that one continuous hot air supply is provided for the vertical cavity 12.1 and another for the vertical cavity 12.2. In this manner, the temperatures within the two oven cavities can be varied as desired with respect to one another. Identical numerals are used for the elements of these hot air systems; certain duct lines have been omitted from the right hand side of FIG. 4 for purposes of clarity. Hot gas within the radiant ducts 13.1 is received by the gas takeup plenums 13.5 which in turn are served by the return duct 14.3, the hot air thus flowing in generally a closed loop from the burner/blower assembly 14.1/14.2 to the radiant duct interiors 13.1 and thence back to the burner/blower assembly. The hot air in this loop may have a relatively high flow rate so as to avoid undesired vertical temperature gradients within the radiant ducts 13.1. Temperature sensors may be placed within the radiant ducts or against the surface of the radiant panel to measure the temperature thereof, and the resulting signal may be employed by commercially available control instrumentation to vary the output of the heaters 14.1; controllers of this type - in which electric energy delivered to a heater is controlled as a function of a set temperature and a measured temperature, are well known and need not be described further. Of importance, the hot air loop thus described is essentially closed; there is no opportunity for hot air within this loop to become contaminated with, for example, volatiles or other impurities that arise from heating of the workpiece 12.4 within the oven cavities.

The vertical oven cavities shown in FIGS. 4 and 5 similarly are served from their ends with heated air from a second source which, in this embodiment, does not intermingle with the essentially closed hot air loop described above. Positioned adjacent the upper and lower ends of the oven cavities are air nozzles shown generally as 16, the nozzles being oriented so as to discharge air toward the central portion of the vertical oven cavities rather than directly against the workpiece 12.4. The nozzles, of course, may be oriented as desired with respect to the workpiece. It is a well known fact that heated air tends to rise. As shown by the arrows in FIGS. 4 and 5, providing a nozzle 16 adjacent the upper end of the vertical oven cavity will tend to counteract this tendency and redirect the airflow back toward the center of the oven cavity. As will be evident to one of the ordinate skill of the art, this controlled flow of heated air permits more precise temperature control than that which is possible if heated air is allowed to rise unchecked. The nozzles are served by supply plenums 16.1 which in turn receive heated air from supply ducts, the nozzles at the upper end of the cavity 12.1 receiving hot air from upper supply duct 16.2 and the nozzles near the lower end of the vertical cavity 12.1 receiving hot air from lower supply duct 16.3. The hot air emerging from the nozzles thus travels in contact with the workpiece toward the center of the vertical cavities and then exits through exhaust plenums 16.4 (best shown in FIG. 5) which in turn are served by exhaust ducts 16.5. These ducts convey "dirty" air (air which has picked up volatiles or other pollutants from the workpiece as a result of the workpiece heating process) to blower 16.6 which in turn exhausts the dirty air through duct 16.7 and thence into main exhaust duct 16.8. The exhaust ducts 16.5 also receive air from a lower compartment 16.8 beneath the vertical oven cavities to scavenge "dirty" air which may have leaked downwardly from the oven cavities. As a further precaution, exhaust plenums 16.9 are provided at the top and bottom ends of the oven cavities to exhaust "dirty" air from the ends of the oven cavities into exhaust ducts 16.5. At the upper end of the oven, the turnaround chamber 12.5 similarly is provided with an exhaust blower 17 which receives air from the turnaround chamber and exhausts the air to the upper exhaust duct 16.7. Fresh air is permitted to enter the turnaround chamber through filter 17.2 and supply duct 17.3.

As thus described, "dirty" air, which has been in contact with the workpiece, is exhausted from the oven cavities in a thorough fashion so that even minute amounts of dirty air which may escape upwardly or downwardly from the oven cavities are collected and exhausted, the dirty air finally entering main exhaust line 16.8. This line in turn conveys "dirty" air to an incinerator 18 which may be operated, for example, at a temperature of about 1500° F., the incinerated and hence cleansed air exiting through the stack 18.1. A heat exchanger 18.2 is provided just downstream from the incinerator, the heat exchanger being served by the air exiting from the incinerator and by fresh, ambient air entering the heat exchanger through the filter 18.3. The fresh air stream is thus heated and is drawn through fresh air ducts 18.4 by upper and lower blowers 18.5, 18.6. Each of the last mentioned blowers is also provided with an ambient fresh air supply through filters 18.7, the quantity of ambient fresh air delivered to the blowers being controlled by controllable dampers 18.8. Hot fresh air exiting from the blowers 18.5 and 18.6 is delivered, respectively, into the above described upper and lower supply ducts 16.2, 16.3. Blowers identical to those shown at 18.5 and 18.6 in FIG. 4, together with fresh air supplies, are employed to serve the upper and lower supply ducts 16.2, 16.3 FIG. 2.

The amount and temperature of hot fresh air that enters the oven cavity through the nozzles 16 can be controlled by regulating, in a known fashion, the blowers 18.5, 18.6 or the dampers 18.8 or both, the dampers desirably being controlled to admit more or less fresh air at ambient temperature. As shown in FIG. 4, a separate blower and damper is associated with each nozzle 16, permitting independent control of the flow rate and temperature (by admixture with a controlled volume of ambient air) of the air delivered by each nozzle. As such, the temperature within the portion of the oven cavity adjacent each radiant panel 13 may be varied independently. As will be understood by those skilled in the art, this allows one to "profile" the temperature within the oven cavity, i.e., to vary the parameters of the heat treatment provided in different areas of the oven cavity.

Figure 7:
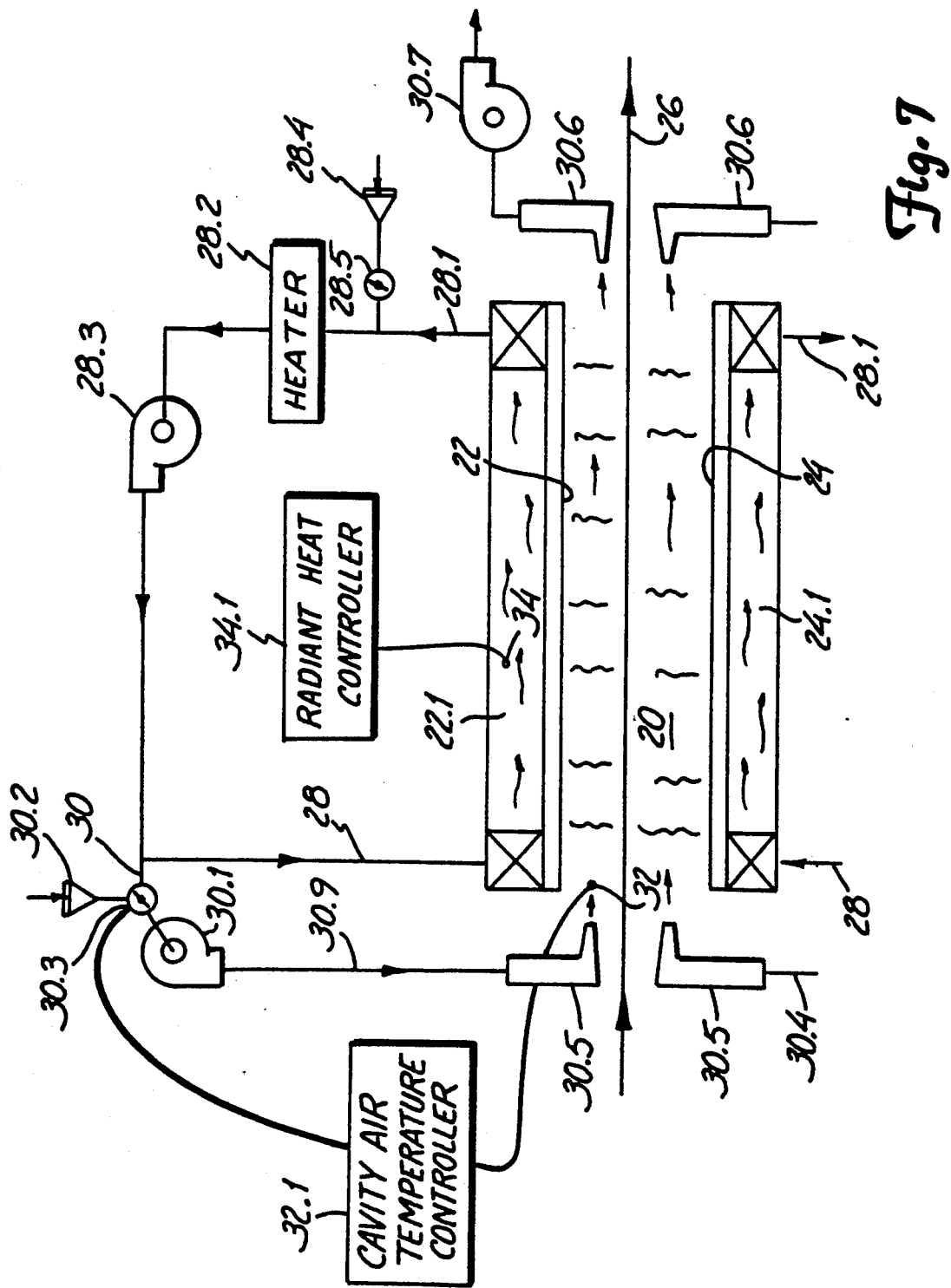
FIG. 7 is a schematic view of another embodiment of the oven of the invention.

Referring to FIG. 7, which is a simplified, schematic view of another embodiment, an oven cavity is shown at 20 and is defined in part by opposed, spaced radiant panels 22, 24 which radiate heat inwardly of the oven cavity to heat a workpiece traveling along the path 26. The radiant panels 22, 24 form opposed walls of the ducts 22.1, 24.1, respectively.

In a manner similar to that described above, clean air flows through a supply duct 28 to the radiant ducts 22.1, 24.1, the clean, hot air then returning through return ducts 28.1 and passing through a heater 28.2 and a blower 28 3 and thence again into supply duct 28. Without more, hot, clean air would continue to circulate in the loop thus described.

A bleeder duct 30 draws hot, clean air from the supply duct 28 through blower 30.1 Fresh air also may enter the blower 30.1 through filter 30.2 and damper 30.3, the latter determining the ratio of fresh air and hot clean air that is delivered to the blower 30.1. Another supply duct 30.4 delivers hot air from the blower 30.1 to nozzles 30.5 generally of the type described above, the nozzles directing the air inwardly of the oven cavity 20. When the air has made a single pass through the oven, it is received by means of the exhaust nozzles 30.6 and is exhausted by means of a blower 30.7 to a suitable incinerator or other air scrubbing device. To make up for the hot, fresh air passing through the duct 30, fresh air may enter the line 28.1 through filter 28.4 and, if desired, damper 28.5.

The temperature of air passing into the cavity may be measured at the entrance to the cavity, as shown by temperature sensor 32, and a cavity air temperature controller 32.1 may be employed in a known fashion to regulate the damper 30.3 and thus control the amount of fresh air that enters through filter 30.2. The temperature of the radiant panel may be controlled by measuring, for example, the temperature of hot air within the radiant panel ducts 22.1, 24.1, as at point 34, and then controlling the energy output of the heater 28.2 by means of a commercially available controller 34.1.

In the last described embodiment, the volume of air that passes through the radiant panel ducts 22.1, 24.1 desirably is much greater than that which passes through the oven cavity itself. In either of the described designs, however, only a relatively small amount of air must be exhausted and scrubbed, since the air which enters the oven cavity serves primarily to carry off products of the heating process rather than to be the primary source of heat for the workpiece. Primary heating of the workpiece occurs through radiation from the radiant panels, and the hot, clean air which heats the radiant panels can be recirculated because it does not incur contamination.

While a preferred embodiment of the present invention has been described, it should be understood that various changes, adaptations and modifications may be made therein without departing from the spirit of the invention and the scope of the appended claims.

I claim.

1. A material treatment oven comprising a housing defining an elongated, generally vertical oven cavity having open ends for material to enter and exit the cavity; a radiant panel having a surface facing the interior of the oven cavity for radiating heat energy to material passing through the cavity; a source of hot gas; plenum means for communicating a stream of hot gas from the hot gas source to the reverse side of the panel to heat the same and to return the stream of the hot gas source; second plenum means for conveying a second hot gas stream through the oven cavity to contact a workpiece therein, the second plenum means including nozzle means for directing the flow of said second stream, said nozzle means directing the flow of said gas within an upper portion of said generally vertical oven cavity in a generally downward direction; and exhaust means for exhausting said second stream of gas from the cavity.

2. The material treatment oven of claim 1 including a second gas heating means for heating said second stream of gas.

3. The material treatment oven of claim 1 wherein said second plenum means communicates hot gas from said hot gas source to the interior of the oven cavity, the oven including damper means for admitting fresh gas to the hot gas entering the oven cavity, whereby the second gas stream entering the oven cavity is cooler than gas entering the first plenum for heating the radiant panel.

4. A material treatment oven comprising a housing defining an elongated oven cavity having open ends through which material to be treated enters and exits the cavity; a radiant panel having a first radiant surface facing the interior of, and forming a wall of, the oven cavity; a source of clean, hot gas; first plenum means for delivering hot gas from said source to the other side of the radiant panel means to heat the panel and for recirculatinq said clean gas to the hot gas source, second plenum means for conveying clean, hot gas from said source to the oven cavity; and exhaust means for exhausting hot gas from the oven cavity when the hot gas has made a single pass therewithin, said exhaust means including means for preventing return of exhausted hot gas to the hot gas source.

5. The material treatment oven of claim 4 including damper means for admitting cooler gas to the hot gas entering the oven cavity, whereby the second stream of gas entering the oven cavity is at a temperature lower than that of the gas flowing through the first plenum to heat the radiant panel means.

6. A material treatment oven comprising a housing defining an elongated, vertical oven cavity having open ends through which material to be treated may enter and exit the cavity, a radiant panel having a first radiant surface facing the interior of the oven cavity and forming a wall of the oven cavity, a duct carried adjacent the oven cavity, a wall of which is formed by the radiant panel, the radiant panel sealing the interior of the duct from the interior of the oven cavity, a source of clean, hot gas, first plenum means for delivering a stream of hot gas from said source to said duct to heat the radiant panel and to recirculate said clean gas from the duct to the hot gas source, the source, plenum and duct forming a hot gas loop through which clean, hot gas may be recirculated, second plenum means for conveying a second stream of clean, hot gas to the oven cavity, and exhaust means for exhausting hot gas from the oven cavity and for preventing the exhausted hot gas stream from entering the hot gas loop.

7. The material treatment oven of claim 6 including a second radiant panel having a radiant surface facing the interior of the oven cavity at a position opposite that of the first-mentioned radiant panel, a second duct carried adjacent the oven cavity, the second radiant panel forming a wall of the second duct and sealing the interior of the second duct from the oven cavity, the first plenum means providing clean, hot gas from said source to both ducts and recirculating hot gas from both ducts to the hot gas source.

8. The oven of claim 7 wherein said housing further defines a second elongated, vertical oven cavity having open ends through which material to be treated may enter and exit the cavity, the second oven cavity being positioned adjacent the first-mentioned oven cavity, said second cavity including a third radiant panel having a radiant surface facing the interior of the second oven cavity and forming a wall of said cavity, and a third duct carried adjacent said second oven, the third radiant panel forming a wall of the third duct and sealing the interior of the third duct from said second oven cavity.

9. The oven of claim 8 wherein said second oven cavity includes a fourth radiant panel having a radiant surface facing the interior of the oven cavity at a position opposite that of the third radiant panel, and a fourth duct carried adjacent the oven cavity, the fourth radiant panel forming a wall of the fourth duct and sealing the interior of the fourth duct from the oven cavity, said first plenum means providing clean, hot gas from said source to all four of said ducts and recirculating hot air from all four ducts to said source.

10. The oven of claim 8 wherein said housing further defines a turnaround chamber disposed above both of said oven cavities, said turnaround chamber including roller means for supporting and guiding a work piece from the first-mentioned oven cavity toward said second oven cavity.

11. The oven of claim 8 wherein said second plenum means communicates hot gas from said hot gas source to the interior of the oven cavity.

12. The oven of claim 7 wherein said second plenum means includes nozzle means for directing the flow of said second stream of hot gas, said nozzle means directing the flow of said gas within an upper portion of said generally vertical oven cavity in a generally downward direction.

13. The oven of claim 12 wherein said second plenum means includes a plurality of said nozzle means, with each nozzle means being independently controllable and including a blower and a controllable damper means for introducing into said nozzle means gas cooler than the gas for said hot gas source.

14. The oven of claim 6 wherein said second plenum means communicates hot gas from said hot gas source to the interior of the oven cavity.

* * * * *

UNITED STATES PATENT AND TRADEMARK OFFICE
CERTIFICATE OF CORRECTION

PATENT NO. : 5,263,265
DATED : November 23, 1993
INVENTOR(S) : Melgaard, Hans L.

It is certified that error appears in the above-identified patent and that said Letters Patent is hereby corrected as shown below:

Column 2, line 28, delete "chances" and insert -- changes--.

Column 6, line 4, delete "the ordinate" and insert --ordinary--.

Column 6, line 60, add--between 163 and Fig. 2--which in turn serve the oven cavity 12.2, these being shown in--

Signed and Sealed this

Third Day of October, 2000

Attest:

Q. TODD DICKINSON

Attesting Officer

Director of Patents and Trademarks